US009959416B1

(12) United States Patent
Ho et al.

(10) Patent No.: US 9,959,416 B1
(45) Date of Patent: May 1, 2018

(54) SYSTEMS AND METHODS FOR JOINING ONLINE MEETINGS

(71) Applicant: Google Inc., Mountain View, CA (US)

(72) Inventors: Ronald Ho, Sunnyvale, CA (US); Kevin Allen, Mountain View, CA (US); Theresa Liberman, San Francisco, CA (US); Pui See Priscilla Mok, San Francisco, CA (US); Marco Quiros Viquez, San Jose, CA (US); Christopher Paul David Johnson, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 182 days.

(21) Appl. No.: 14/670,514

(22) Filed: Mar. 27, 2015

(51) Int. Cl.
| G06F 7/06 | (2006.01) |
| H04L 29/06 | (2006.01) |
| G06F 21/62 | (2013.01) |
| H04L 12/18 | (2006.01) |
| G06F 21/40 | (2013.01) |
| G06F 17/30 | (2006.01) |
| H04L 9/32 | (2006.01) |

(52) U.S. Cl.
CPC ........ *G06F 21/62* (2013.01); *G06F 17/30864* (2013.01); *G06F 21/40* (2013.01); *H04L 12/1822* (2013.01); *H04M 2203/5009* (2013.01)

(58) Field of Classification Search
CPC . H04L 12/1822; H04L 67/24; H04L 67/1046; H04L 63/104; H04L 65/403; G06F 17/30864; G06F 21/40; G06F 21/62
See application file for complete search history.

(56) References Cited

U.S. PATENT DOCUMENTS

| 6,016,478 | A | 1/2000 | Zhang et al. |
| 6,094,681 | A | 7/2000 | Shaffer et al. |
| 6,286,034 | B1* | 9/2001 | Sato ........................ G06F 9/54 709/204 |
| 6,519,629 | B2 | 2/2003 | Harvey et al. |
| 6,574,630 | B1 | 6/2003 | Augustine et al. |

(Continued)

FOREIGN PATENT DOCUMENTS

EP    2224683 A1    9/2010

OTHER PUBLICATIONS

Mann, Bill. "How to Do Everything with Microsoft Office Outlook 2003," McGraw-Hill/Osborne, 2003, pp. 172-187, 192-195, 205-208, 404-408.

(Continued)

*Primary Examiner* — Michael Simitoski
(74) *Attorney, Agent, or Firm* — Young Basile Hanlon & MacFarlane, P.C.

(57) ABSTRACT

A method includes receiving, at a meeting server, a first input from a first computing device associated with a first user; identifying, at the meeting server, a second user who is connected to an in-progress meeting using the first input; transmitting an access request message from the meeting server to a computing device associated with the second user; and in response to receiving a positive response to the access request message at the meeting server from the second computing device, granting the first user access to the in-progress meeting.

17 Claims, 8 Drawing Sheets

(56) References Cited

U.S. PATENT DOCUMENTS

| | | | |
|---|---|---|---|
| 6,687,358 B1* | 2/2004 | Mark | H04L 12/1822 379/202.01 |
| 6,965,917 B1 | 11/2005 | Aloni et al. | |
| 7,082,402 B2 | 7/2006 | Conmy et al. | |
| 7,305,380 B1* | 12/2007 | Hoelzle | G06F 17/30424 |
| 7,487,211 B2 | 2/2009 | Beavers et al. | |
| 7,818,394 B1* | 10/2010 | Lawler | G06Q 10/10 709/200 |
| 8,005,203 B2 | 8/2011 | Archambault et al. | |
| 8,095,665 B1 | 1/2012 | Bau | |
| 8,368,738 B2 | 2/2013 | Schindler | |
| 8,400,489 B2 | 3/2013 | Le Goff et al. | |
| 8,477,176 B1 | 7/2013 | Cortes et al. | |
| 8,699,686 B2 | 4/2014 | Goguen et al. | |
| 8,718,253 B2* | 5/2014 | Sharland | H04L 12/1822 379/158 |
| 8,754,926 B1 | 6/2014 | Gossweiler et al. | |
| 9,251,273 B2* | 2/2016 | O'Sullivan | C12N 15/8286 |
| 9,703,844 B2* | 7/2017 | Campbell | G06F 17/30554 |
| 2002/0076025 A1 | 6/2002 | Liversidge et al. | |
| 2003/0154116 A1 | 8/2003 | Lofton | |
| 2004/0073615 A1 | 4/2004 | Darling | |
| 2004/0078436 A1 | 4/2004 | Demsky et al. | |
| 2004/0199412 A1 | 10/2004 | McCauley | |
| 2005/0033615 A1 | 2/2005 | Nguyen et al. | |
| 2005/0044503 A1 | 2/2005 | Richardson et al. | |
| 2005/0216842 A1 | 9/2005 | Keohane et al. | |
| 2005/0268329 A1* | 12/2005 | Lee | H04L 12/581 726/3 |
| 2006/0184885 A1 | 8/2006 | Hayes, Jr. et al. | |
| 2006/0190485 A1 | 8/2006 | Adams et al. | |
| 2006/0190547 A1 | 8/2006 | Bhogal et al. | |
| 2006/0195480 A1* | 8/2006 | Spiegelman | G06F 17/30766 |
| 2006/0224969 A1 | 10/2006 | Marston | |
| 2007/0011233 A1* | 1/2007 | Manion | G06Q 10/10 709/204 |
| 2007/0073810 A1 | 3/2007 | Adams et al. | |
| 2007/0189487 A1* | 8/2007 | Sharland | H04L 12/1822 379/202.01 |
| 2007/0198316 A1 | 8/2007 | Boland et al. | |
| 2007/0233708 A1* | 10/2007 | Baio | G06F 17/30864 |
| 2008/0046311 A1 | 2/2008 | Shahine et al. | |
| 2010/0125605 A1* | 5/2010 | Nair | G06F 17/30867 707/784 |
| 2011/0137932 A1* | 6/2011 | Wable | G06F 17/30867 707/769 |
| 2011/0150198 A1* | 6/2011 | Walsh | H04M 3/56 379/202.01 |
| 2011/0193795 A1* | 8/2011 | Seidman | G01C 21/3664 345/173 |
| 2011/0231240 A1 | 9/2011 | Schoen et al. | |
| 2011/0246475 A1* | 10/2011 | Shelton | G06F 21/6245 707/741 |
| 2012/0011205 A1* | 1/2012 | Paulsami | G06Q 10/1095 709/206 |
| 2012/0150581 A1 | 6/2012 | McPhail | |
| 2012/0166433 A1* | 6/2012 | Tseng | G06O 30/0224 707/728 |
| 2012/0265808 A1* | 10/2012 | Ezell | H04L 12/1822 709/204 |
| 2013/0036109 A1* | 2/2013 | Kulick | G06Q 10/10 707/722 |
| 2013/0080922 A1* | 3/2013 | Elias | G06O 50/01 715/753 |
| 2013/0110822 A1* | 5/2013 | Ikeda | G06F 17/3087 707/722 |
| 2013/0258038 A1 | 10/2013 | Bychkov | |
| 2013/0282421 A1 | 10/2013 | Graff et al. | |
| 2014/0172563 A1* | 6/2014 | Amit | G06O 50/01 705/14.54 |
| 2014/0188899 A1* | 7/2014 | Whitnah | G06F 17/30646 707/749 |
| 2014/0258309 A1* | 9/2014 | Young | G06F 17/3053 707/748 |
| 2014/0280046 A1* | 9/2014 | Itay | G06F 17/30979 707/722 |
| 2014/0310044 A1 | 10/2014 | Meltzer et al. | |
| 2014/0313282 A1 | 10/2014 | Ma et al. | |
| 2014/0317532 A1 | 10/2014 | Ma et al. | |
| 2015/0004571 A1* | 1/2015 | Ironside | G09B 5/10 434/185 |
| 2015/0106091 A1* | 4/2015 | Wetjen | G10L 15/26 704/235 |
| 2015/0304361 A1* | 10/2015 | Tamura | H04M 3/56 370/262 |
| 2015/0381629 A1* | 12/2015 | O'Sullivan | H04L 63/101 726/4 |
| 2016/0062610 A1* | 3/2016 | Yuki | G06F 3/04842 715/835 |
| 2016/0275433 A1* | 9/2016 | Gil | G06Q 10/06395 |

OTHER PUBLICATIONS

Nyamgondalu, Nagendra, "Lotus Notes Calendar and Scheduling explained" IBM developerWorks. Oct. 2004 Web. Dec. 9, 2004, http://web.archive.org/web/20041209233627/www-106.ibm.com/developerworks/- lotus/library/cs-pt1.

* cited by examiner

SYSTEMS AND METHODS FOR JOINING ONLINE MEETINGS

BACKGROUND

Online meetings allow multiple meeting participants to communicate and share information of various types. Online meetings can include features such as audiovisual content. One example is a screencast, in which graphical content (such as webcam video or a screencast) and audio narration from a meeting organizer's computer is transmitted to other participant's computers in real-time. Another example is a video call or video chat in which multiple participants record and transmit real-time video. Online meetings can be implemented using peer-to-peer technologies or server-based technologies.

Typically, an online meeting has one or more organizers, and one or more additional participants. Meetings can be "public," meaning that access is not limited to authorized participants, or can be "private," with access being limited to authorized participants. Known online meeting systems use several methods to allow participants to join an in-progress meeting that has been previously initiated by one of the organizers of the meeting. As one example, meeting invitations can include an alphanumeric code that can be transmitted to the meeting server by the user, such as via a dialog box in a user interface for the meeting server. As another example, meeting invitations can include a hyperlink that allows the user in possession of the hyperlink to join the meeting.

SUMMARY

One aspect of the disclosed embodiments is a method that includes receiving, at a meeting server, a first input from a first computing device associated with a first user; identifying, at the meeting server, a second user who is connected to an in-progress meeting using the first input; transmitting an access request message from the meeting server to a computing device associated with the second user; and in response to receiving a positive response to the access request message at the meeting server from the second computing device, granting the first user access to the in-progress meeting.

Another aspect of the disclosed embodiments is an apparatus that includes a memory and a processor configured to execute instructions stored in the memory. The instructions cause the processor to receive a first input from a first computing device associated with a first user; identify a second user who is connected to an in-progress meeting using the first input; transmit an access request message to a computing device associated with the second user; and in response to receiving a positive response to the access request message from the second computing device, grant the first user access to the in-progress meeting.

Another aspect of the disclosed embodiments is a non-transitory computer-readable storage device including program instructions executable by one or more processors that, when executed, cause the one or more processors to perform operations. The operations include receiving, at a meeting server, a first input from a first computing device associated with a first user; identifying, at the meeting server, a second user who is connected to an in-progress meeting using the first input; transmitting an access request message from the meeting server to a computing device associated with the second user; and in response to receiving a positive response to the access request message at the meeting server from the second computing device, granting the first user access to the in-progress meeting.

BRIEF DESCRIPTION OF THE DRAWINGS

The description herein makes reference to the accompanying drawings wherein like reference numerals refer to like parts throughout the several views, and wherein.

DETAILED DESCRIPTION

Users that are trying to join an online meeting, such as a video chat, sometimes do not possess the information required to join the meeting, such as a special link, an alphanumeric code, or a phone number. According to the systems and methods described herein, a meeting management system receives information from the user in the form of one or more items of identifying information that describe at least one the other participants in the meeting. The one or more items of identifying information can be unique or non-unique identifying information. The meeting management system uses the identifying information to locate one or more in-progress meetings having a participant that matches the identifying information. Upon identifying a meeting participant based on the identifying information, the meeting participant is sent an access request message. If the meeting participant grants access to the meeting in response to the access request message, the user is granted access to the in-progress meeting and can then join the meeting.

The systems and methods described herein thus allow users to join in-progress meetings regardless of whether they possess a unique access code or are able to utilize some other self-authorization technique. At the same time, the systems and methods herein do not require the existence of particular in-progress meetings be advertised publicly, and do not require that the fact that a specific user is currently participating in a meeting to be advertised publicly. Instead, the decision to give access to this information is in the hands of the meeting organizer or other participants, as the existence of the meeting and its participants is only confirmed when the meeting organizer or participants grant a particular user access to join the meeting. Thus, privacy can be maintained as to the existence of the meeting and its participants.

Figure 1:
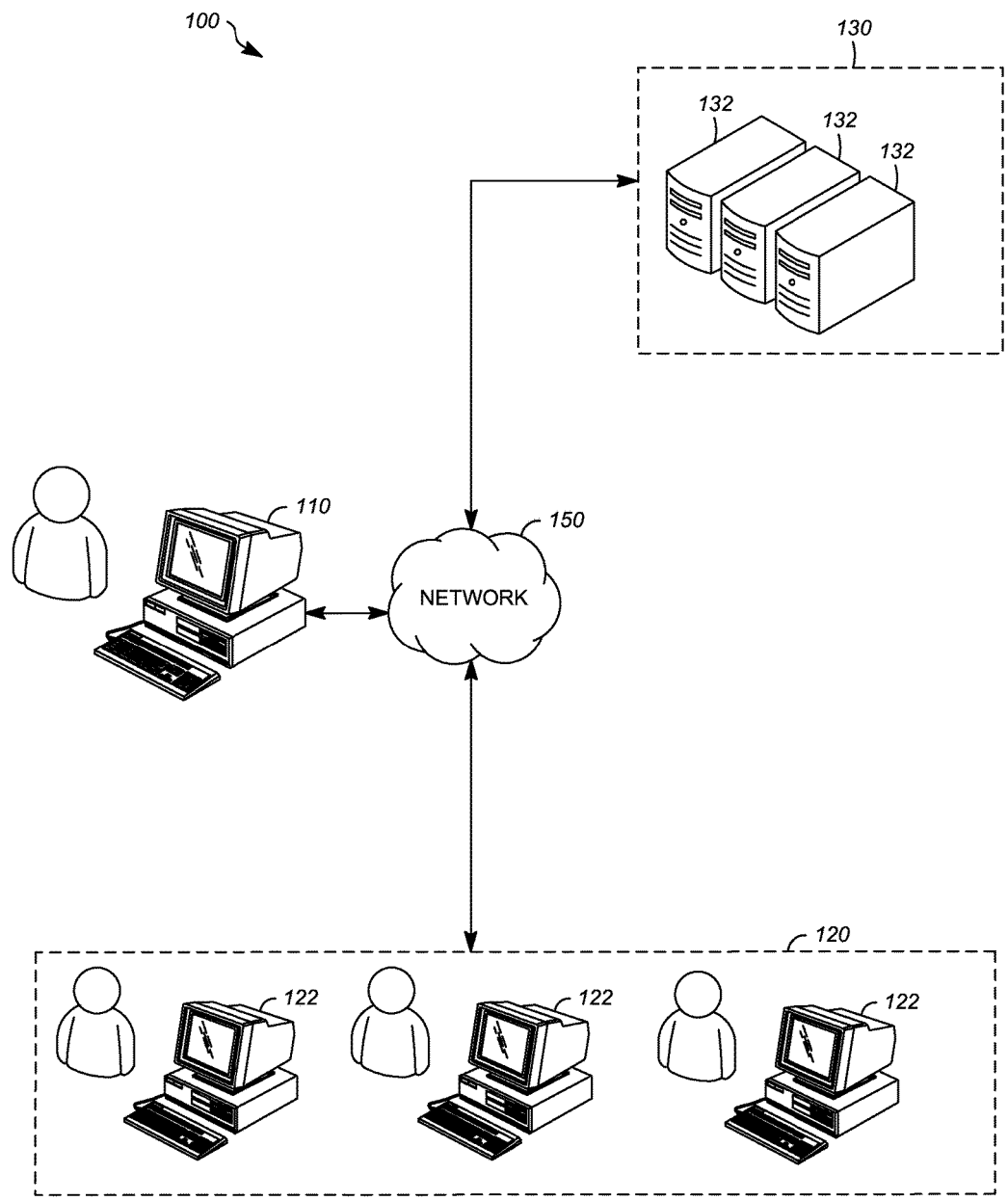
FIG. 1 is a block diagram showing an example of an environment in which a system for locating a meeting can be implemented.

FIG. 1 shows an example of an environment 100 in which a system for locating a meeting can be implemented. The environment 100 can include a user system 110 and a group of meeting participants 120 that includes one or more meeting participant systems 122. The user system 110 and each of the meeting participant systems 122 are associated with a person, and can be located at different physical locations (e.g. in different cities) or can be co-located (e.g. in the same room). The environment 100 also includes an application hosting service 130. The user system 110 and the meeting participant systems 122 are each representative of a large number (e.g. millions) of systems that can be included in the environment 100, with each system being able to utilize one or more applications that are provided by the application hosting service 130.

The user system 110 and the meeting participant systems 122 can each be any manner of computer or computing device, such as a desktop computer, a laptop computer, a tablet computer, or a smart-phone (a computationally-enabled mobile telephone). The application hosting service 130 can be implemented using one or more server computers 132. The user system 110, the meeting participant systems 122, and the application hosting service 130 can each be implemented as a single system, multiple systems, distributed systems, or in any other form.

The systems, services, servers, and other computing devices described here are in communication via a network 150. The network 150 can be one or more communications networks of any suitable type in any combination, including wireless networks, wired networks, local area networks, wide area networks, cellular data networks, and the internet.

The application hosting service 130 can provide access to one or more hosted applications to a defined group of users including operators associated with the user system 110 and the meeting participant systems 122. One of the hosted applications is a cloud storage service that allows users to access, store, organize, and store electronic documents of all types. The cloud storage service implements user accounts so that documents stored at the cloud storage service by the user are associated with the user, who is considered the owner of the document. The cloud storage service also implements user-specified access control that allows the user to grant other users access to documents (i.e. "share"). The hosted applications can also include an electronic mail system and a photo storage system. With respect to any of the hosted applications, the application hosting service can be operable to transmit information to the user system 110 that, when interpreted by the user system 110, causes the user system 110 to output an interface screen of the respective hosted application for display on a display device that is associated with that user system 110.

Figure 2:
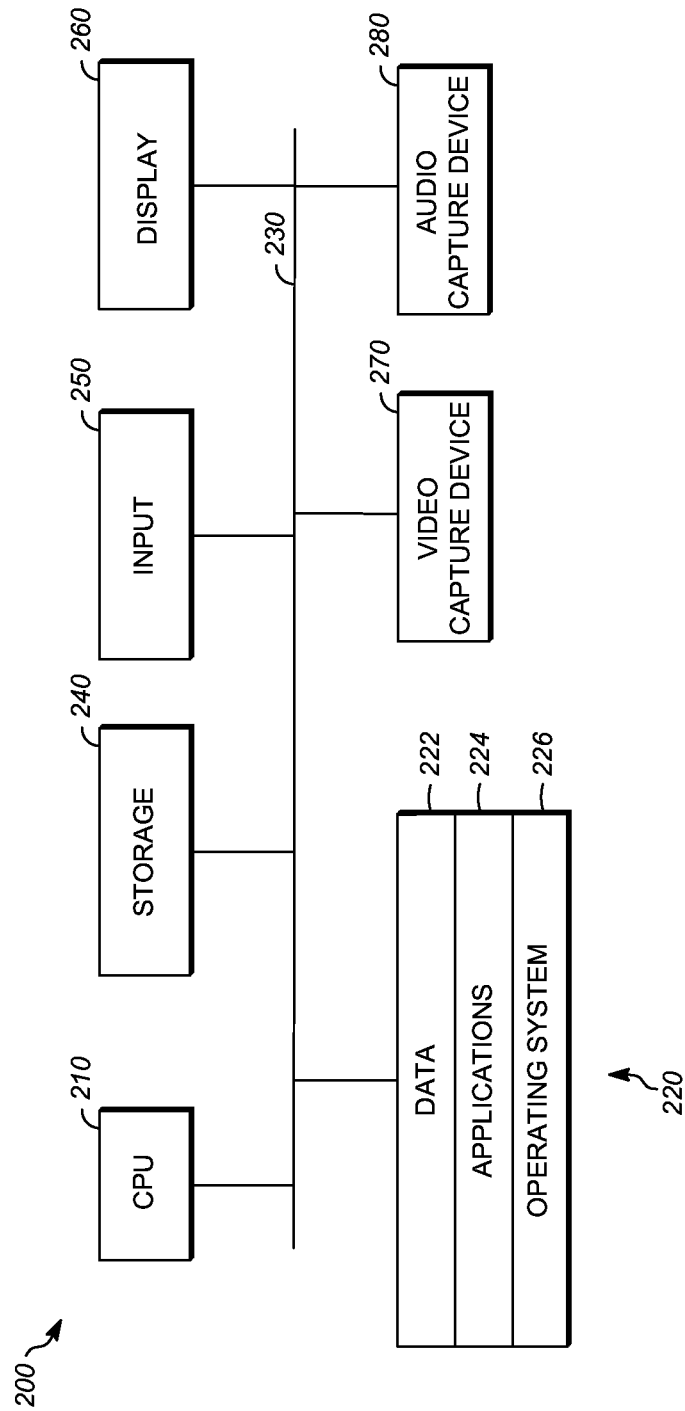
FIG. 2 is a block diagram showing an example of a hardware configuration for a computing device.

FIG. 2 is a block diagram of an example of a hardware configuration for a computing device 200. The computing device 200 can or a similar configuration can be utilized to implement user system 110, the meeting participant systems 122, and the one or more server computers 132. The computing device 200 can include a CPU 210. The CPU 210 can be a conventional central processing unit. Alternatively, the CPU 210 can be any other type of device, or multiple devices, capable of manipulating or processing information now-existing or hereafter developed. Although the disclosed examples can be practiced with a single processor as shown, e.g. CPU 210, advantages in speed and efficiency can be achieved using more than one processor.

The computing device 200 can include memory 220, such as a random access memory device (RAM). Any other suitable type of storage device can also be used as the memory 220. The memory 220 can include code and data 222 that can be accessed by the CPU 210 using a bus 230. The memory 220 can further include one or more application programs 224 and an operating system 226. The application programs 224 can include software components in the form of computer executable program instructions that cause the CPU 210 to perform the operations and methods described here.

A storage device 240 can be optionally provided in the form of any suitable computer readable medium, such as a hard disc drive, a memory device, a flash drive, or an optical drive. One or more input devices 250, such as a keyboard, a mouse, or a gesture sensitive input device, receive user inputs and can output signals or data indicative of the user inputs to the CPU 210. One or more output devices can be provided, such as a display device 260. The display device 260, such as a liquid crystal display (LCD) or a cathode-ray tube (CRT), allows output to be presented to a user, for example, in response to receiving a video signal.

The computing device 200 can also include a video capture device 270 and an audio capture device 280. The video capture device 270 can be a conventional digital camera or any other device operable to provide a video image in a computer interpretable form. The audio capture device 280 can be a conventional microphone or any other device operable to provide a sound in a computer interpretable form. In one implementation, the video capture device 270 and the audio capture device 280 are portions of a conventional webcam that is mounted to a portion of the computing device 200 and is oriented such that the video capture device 270 captures video images of the person using the computing device 200.

Although FIG. 2 depicts the CPU 210 and the memory 220 of the computing device 200 as being integrated into a single unit, other configurations can be utilized. The operations of the CPU 210 can be distributed across multiple machines (each machine having one or more of processors) which can be coupled directly or across a local area or other network. The memory 220 can be distributed across multiple machines such as network-based memory or memory in multiple machines. Although depicted here as a single bus, the bus 230 of the computing device 200 can be composed of multiple buses. Further, the storage device 240 can be directly coupled to the other components of the computing device 200 or can be accessed via a network and can comprise a single integrated unit such as a memory card or multiple units such as multiple memory cards. The one or more server computers can thus be implemented in a wide variety of configurations.

Figure 3:
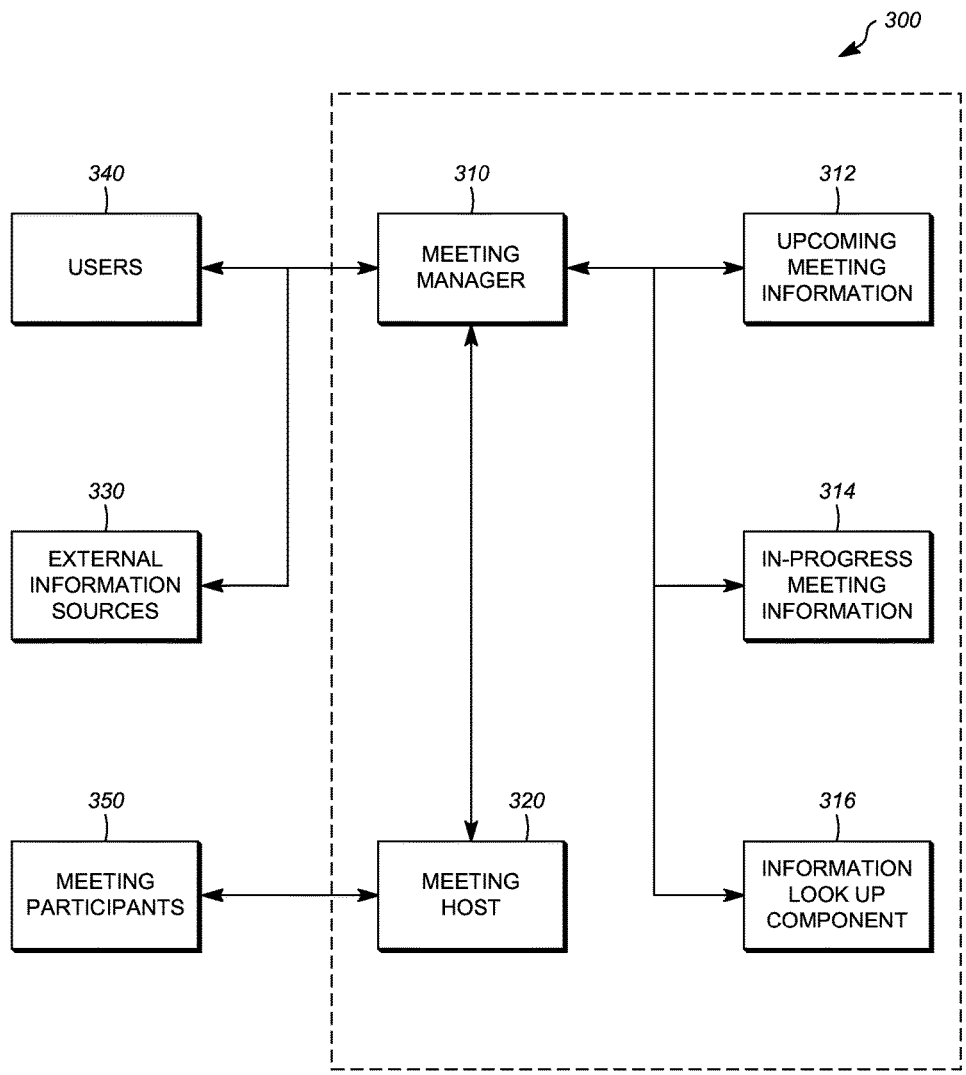
FIG. 3 is a block diagram showing a meeting system.

FIG. 3 is an illustration showing components of a meeting system 300. The meeting system 300 includes a meeting manager 310 that communicates with users 340 who wish to schedule or join a meeting. The meeting system 300 also includes a meeting host 320 that communicates with a larger number (e.g. thousands) of meeting participants 350 who are participating in a large number of individual meetings.

The meeting manager 310 can be implemented using one or more server computers, such as at the one or more server computers 132 of the application hosting service 130. The meeting manager 310 provides a user interface, such as in the form of an internet-accessible application that can be displayed in a web browser of a computing device operated by the user 340, who can be situated at a remote location relative to the meeting manager. The user interface of the meeting manager 310 allows meetings to be scheduled and located, as will be explained in detail herein.

The meeting manager 310 can maintain records regarding upcoming meetings and meetings that are in-progress (referred to herein as "in-progress meetings") as upcoming meeting information 312 and in-progress meeting information 314. The upcoming meeting information 312 can be stored in any suitable form such as in one or more database tables, and include, for example, information regarding all meetings scheduled in the future including, for each meeting, any or all of a date, a time, a duration, information identifying the organizer of the meeting, and/or information identifying some or all of the participants 350 of the meeting. In-progress meeting information 314 can be stored in any suitable form such as in one or more database tables and can include, for example, information regarding all in-progress meetings, including information identifying the meeting and how to connect to it, information identifying the organizer of the meeting, and information describing some or all of the additional participants 350 of the meeting (if any are currently connected to the meeting). With respect to the information stored in the upcoming meeting information 312 and the in-progress meeting information 314, the information identifying the organizer and other participants 350 can include any or all of an email address, a phone number, a first name, a last name (surname), a screen name, and/or information identifying one or more social networking profiles that are associated with the respective participant.

The meeting manager 310 can also include an information lookup component 316. The information lookup component 316 is operable to access the external information sources 330. External information sources 330 are not part of the meeting system 300 but are accessible to it, such as via the internet, and can include additional information regarding the users 340 who are attempting to join meetings and meeting participants 350 who are currently connected to meetings. Examples of external information sources 330 include social networking profiles, contact lists, and email accounts, and calendars.

Typical operation of the meeting manager 310 can include connecting the users 340 to meetings using unique alphanumeric codes, unique hyperlinks, or other strategies that require the user 340 to be in possession of information that explicitly identifies the particular meeting. As previously discussed, this information is typically distributed to participants 350 in advance of a meeting, such as in a meeting invitation that is distributed by email. The meeting manager 310 is operable, however, to allow users 340 to locate and join a meeting when the user 340 is not able to explicitly identify the meeting such as by using an alphanumeric code. In particular, in lieu of an explicit meeting identifier, the meeting manager 310 can prompt the user 340 to enter information identifying the organizer of the meeting or one of the other current participants 350 of the meeting (also referred to herein as "identifying information"). This information is received in the form of a user input that is received at a computing device associated with the user 340 that is seeking to join a meeting, for example, the user system 110. This user input may be referred to herein as meeting search term, and there may be multiple meeting search terms such as a first meeting search term, a second meeting search term, and/or a third meeting search term. Meeting search terms can be unique identifiers that correspond only to a single person (such as an email address), or can be non-unique identifiers that corresponds to more than one person. In some situations, a non-unique identifier can correspond to a large number of persons.

The meeting manager 310 uses the one or more search terms to locate one or more in-progress meetings having a participant that matches the one or more search terms using the in-progress meeting information 314. Matching can be performed with respect to meeting organizers only, or with respect to all meeting participants 350.

In some implementations, the meeting manager 310 uses only the one or more search terms to identify one of the in-progress meetings. As one example, if the one or more search terms include a unique identifier such as an email address, the meeting manager 310 can identify the corresponding meeting participant 350 (if that participant is connected to an in-progress meeting) based only on the unique identifier. As another example, if the one or more search terms include only non-unique identifiers, the meeting manager can locate one or more potential matches from among the participants 350 that are currently connected to in-progress meetings and send some or all of them access requests. If the number of potential matches is overly large (e.g. greater than a threshold value), the meeting manager can prompt the user 340 for an additional search term to further limit the results. This avoids sending too many access requests to the meeting participants.

In other implementations, the meeting manager 310 uses information from the external information sources in addition to one or more search terms that include non-unique identifiers. In these implementations, an initial list of matching participants can be identified using the one or more search terms. To reduce the number of matching participants (e.g. in response to determining that the number of matching participants exceeds a threshold value), information regarding the one or more matching participants can be retrieved from the external information sources 330 such as social media profiles. This external information can be compared to the one or more search terms, or can be compared to external information associated with the user 340 that is attempting to locate a meeting. For instance, the list of matching participants can be reduced so that it includes only participants 350 who are linked to the user 340 via a social networking service. Other types of information that imply a relationship between the user 340 and one or more of the meeting participants 350 can be utilized.

Upon identifying one of the meeting participants 350, the identified meeting participant 350 is sent an access request message. The access request can be displayed in a user interface element that is output for display as part of a meeting interface screen at the computing device used by the identified meeting participant 350. If the meeting participant 350 grants access to the meeting in response to the access request message, the user 340 is granted access to the in-progress meeting and can then join the meeting. For example, upon grant of the access request, a user interface element can be output for display as part of a user interface screen at the computing system utilized by the user 340.

The meeting system 300 also includes a meeting host 320. The meeting host 320 can be implemented using one or more server computers, such as at the one or more server computers 132 of the application hosting service 130. The meeting host 320 is operable to provide a meeting environment for many simultaneous meetings (e.g. thousands), each meeting having a plurality of users. For example, meetings can range in size from two meeting participants 350, such as a video call between two persons, to thousands of simultaneous participants 350, such as a video chat held by a public figure, in which video showing the public figure is broadcast to all participants 350, each of whom can interact, such as by asking written questions. When the organizer of a meeting initiates the meeting, it is performed, by example, by a request sent from a computing device associated with the organizer to the meeting manager 310. The meeting manager 310 responds to the request to initiate the meeting by causing the meeting host 320 to initialize a new meeting environment and add the organizer as a meeting participant 350 within that meeting environment. Additional participants 350 can be added to the meeting environment by the meeting host 320 responsive to instructions received from the meeting manager 310.

The meeting host 320 can receive communications from each of the participants 350, such as audio, video, and/or text input, and route those communications to some or all of the other participants 350. This can be performed, for example, by conventional hardware such as multipoint control units that are included as part of the meeting host 320. It should be understood, however, that while the description herein is made with respect to server-hosted meetings where all communications are relayed by the server, the systems and methods described herein could also be applied to peer-to-peer online meeting systems.

Figure 4:
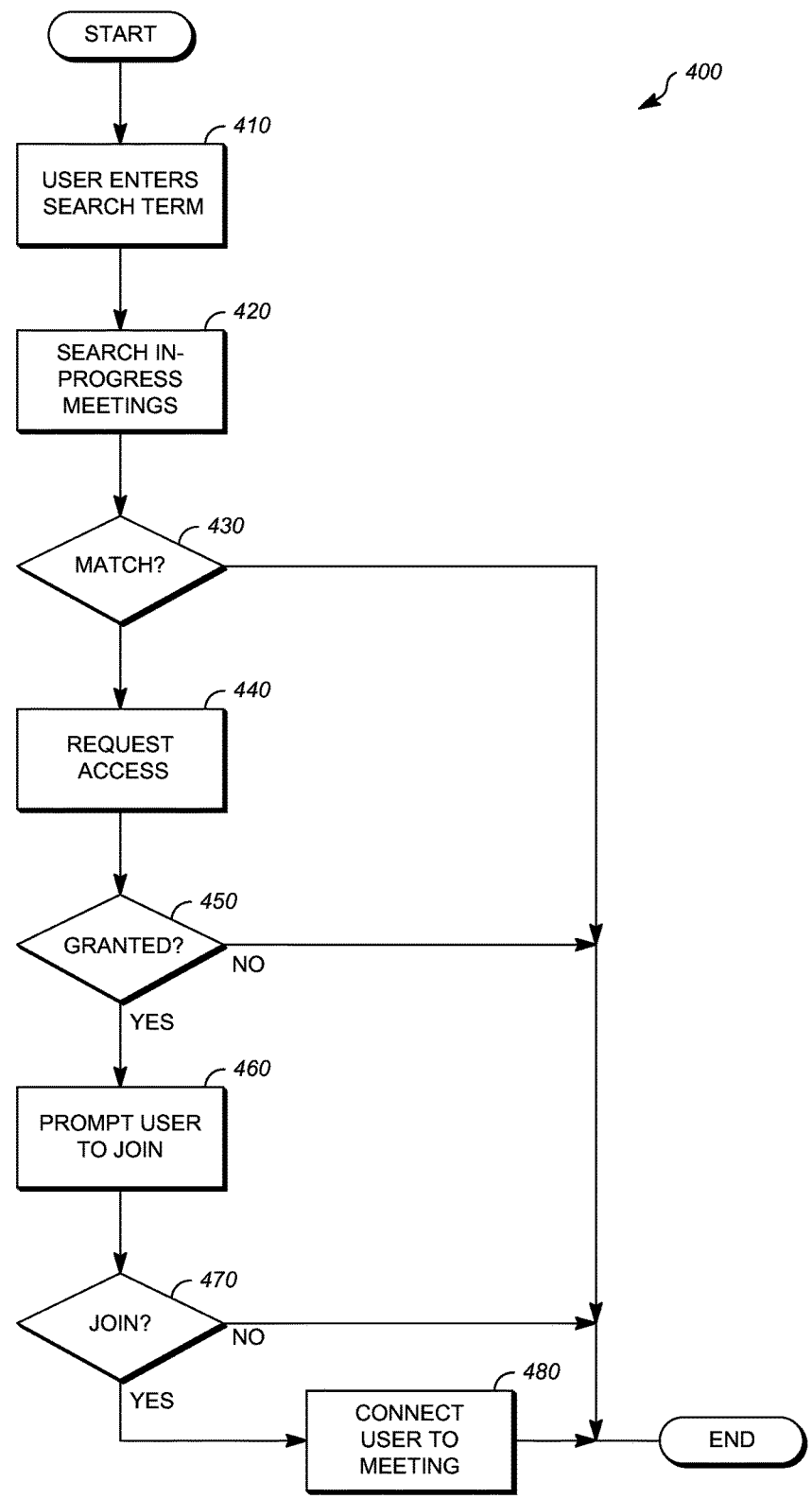
FIG. 4 is a flowchart showing a first example of a process for locating a meeting.

FIG. 4 is a flowchart showing an example of a first process 400 for locating a meeting. The operations described in connection with the first process 400 can be performed at one or more computers, such as at the one or more server computers 132 of the application hosting service 130, or at the user system 110. When an operation is described as being performed by one or more computers, it is completed when it is performed by one computer working alone, or by multiple computers working together. The operations described in connection with the first process 400 can be embodied as a non-transitory computer readable storage medium including program instructions executable by one or more processors that, when executed, cause the one or more processors to perform the operations. For example, the operations described in connection with the first process 400 can be stored at the memory 220 of one of the server computers 132 for execution by the CPU 210 thereof.

Initially the user 340 contacts the meeting manager 310. The user can do this, for example, by accessing an internet web page that serves as a portal or landing page for the meeting system 300. This web page is output for display at a computing device that is being used by the user 340. In operation 410, the user 340 enters a search term. This can be done, for example, by entering the search term into a dialog box that is part of a user interface screen provided by the meeting system 300. In this example, the search term received at operation 410 is a unique identifier that will match only a single one of the meeting participants 350. The search term entered at operation 410 is transmitted to and received by the meeting manager 310.

In operation 420, a determination is made by the meeting manager 310 as to whether the search term matches any in-progress meetings. The search term can match an in-progress meeting if the search term matches to information for the organizer or, optionally, another participant of an in-progress meeting. This determination can be made using the in-progress meeting information 314. At operation 430 the process proceeds to operation 440 if no match is found. Otherwise, the process ends.

At operation 440, the meeting manager 310 contacts the matching meeting participant 350 that was identified at operation 420. This is done, for example, by transmitting an access request message to the identified meeting participant 350. The access request message can be in the form of a user interface element that is output for display as part of a meeting interface screen. The access request message can identify the user 340 that wishes to join the meeting and prompts the meeting participant 350 for an answer as to whether or not the user 340 should be permitted to join the meeting. The answer can be made by the participant in the form of an input, such as by clicking a button in the interfaces, which causes a corresponding message to be transmitted to the meeting manager 310. At operation 450 the process proceeds to operation 460 if access is granted. Otherwise, the process ends.

At operation 460, the meeting manager 310 transmits a message to the user 340, indicating that the user has been granted access to join the meeting. This message can cause interface elements to be output for display as part of an interface screen at the computing device utilized by the user 340. These interface elements, such as buttons, can allow the user 340 to join the meeting or decline to join the meeting. The information transmitted to the user 340 can also include information that confirms the identity of the meeting participant 350 that granted access to the user 340. In response to an input from the user 340 indicating intention to join or not join the meeting, a further message is transmitted from the computing device of the user 340 to the meeting manager 310. At operation 470 the process proceeds to operation 480 if the user 340 elected to join the meeting. Otherwise, the process ends.

At operation 480, the user 340 is connected to the meeting. The process then ends.

Figure 5:
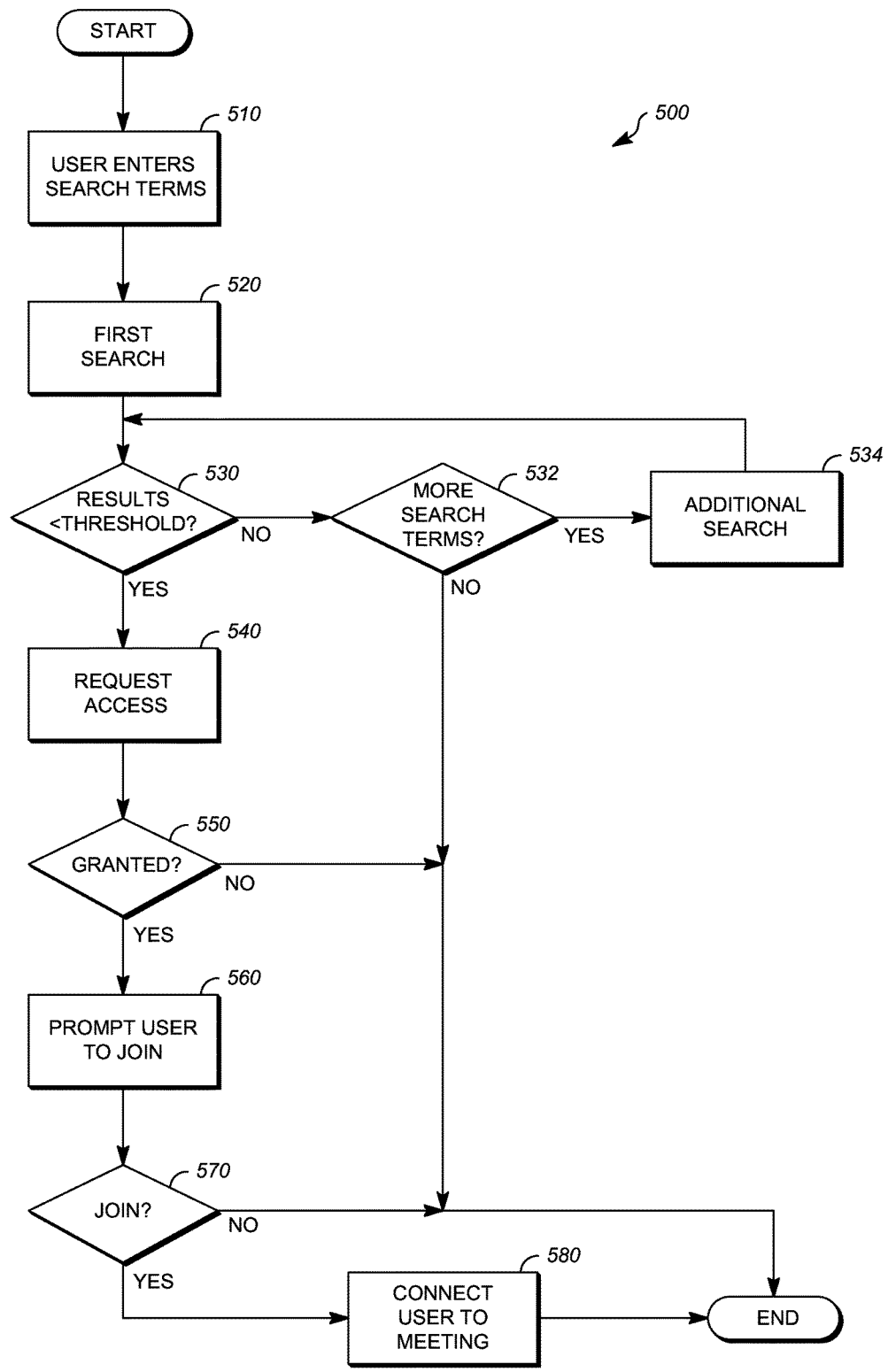
FIG. 5 is a flowchart showing a first example of a process for locating a meeting.

FIG. 5 is a flowchart showing an example of a second process 500 for locating a meeting. The operations described in connection with the second process 500 can be performed at one or more computers, such as at the one or more server computers 132 of the application hosting service 130, or at the user system 110. When an operation is described as being performed by one or more computers, it is completed when it is performed by one computer working alone, or by multiple computers working together. The operations described in connection with the second process 500 can be embodied as a non-transitory computer readable storage medium including program instructions executable by one or more processors that, when executed, cause the one or more processors to perform the operations. For example, the operations described in connection with the second process 500 can be stored at the memory 220 of one of the server computers 132 for execution by the CPU 210 thereof.

Initially the user 340 contacts the meeting manager 310. The user can do this, for example, by accessing an internet web page that serves as a portal or landing page for the meeting system 300. This web page is output for display at a computing device that is being used by the user 340. In operation 510, the user 340 enters one or more search terms. This can be done, for example, by entering the one or more search terms into a dialog box that is part of a user interface screen provided by the meeting system 300. In this example, the search term received at operation 510 is a non-unique identifier that may match many of the meeting participants 350. The search term entered at operation 510 is transmitted to and received by the meeting manager 310.

In operation 520, a first search is performed by the meeting manager 310 to determine whether a first search term from the one or more search terms input at operation 510 matches any in-progress meetings. The first search term can match an in-progress meeting if the search term matches to information for the organizer or, optionally, another participant of an in-progress meeting. This determination can be made using the in-progress meeting information 314. Optionally, multiple search terms can be utilized in the first search performed at operation 520.

Because the one or more search terms in this example are non-unique identifiers, more than one match can result from the first search at operation 520. In some situations, a large number of matches can be returned at operation 520. Because of this, at operation 530, a determination is made as to whether the number of results is less than a threshold value. This operation prevents the meeting manager 310 from sending an overly large number of access request messages. If the number of results is less than the threshold value, the process proceeds to operation 540. If the number of results is greater than the threshold value, the process proceeds to operation 532.

At operation 532, a determination is made as to whether there are additional search terms that can be utilized to reduce the number of matching participants 350 by applying the additional search terms to the results of the first search from operation 520. The additional search terms can be search terms that were entered at operation 510, or in some implementations, the user can be prompted for an additional search term subsequent to operation 530. If there are more search terms, the process proceeds to operation 534. Otherwise, the process ends. At operation 534, an additional search is performed in the manner described with respect to operation 520. The process then returns to operation 530.

At operation 540, the meeting manager 310 contacts one or more meeting participants 350 that were identified at operation 530. This is done, for example, by transmitting an access request message to each of the identified meeting participants 350. The number of access request messages sent is dependent on the results of the search, up to the threshold value used at operation 530. The access request message can be in the form of a user interface element that is output for display as part of a meeting interface screen. The access request message can identify the user 340 that wishes to join the meeting and prompts the meeting participant 350 for an answer as to whether or not the user 340 should be permitted to join the meeting. The answer can be made by the participant in the form of an input, such as by clicking a button in the interfaces, which causes a corresponding message to be transmitted to the meeting manager 310. At operation 550 the process proceeds to operation 560 if access is granted. Otherwise, the process ends.

At operation 560, the meeting manager 310 transmits a message to the user 340, indicating that the user has been granted access to join the meeting. This message can cause interface elements to be output for display as part of an interface screen at the computing device utilized by the user 340. These interface elements, such as buttons, can allow the user 340 to join the meeting or decline to join the meeting. The information transmitted to the user 340 can also include information that confirms the identity of the meeting participant 350 that granted access to the user 340. In response to an input from the user 340 indicating intention to join or not join the meeting, a further message is transmitted from the computing device of the user 340 to the meeting manager 310. At operation 570 the process proceeds to operation 580 if the user 340 elected to join the meeting. Otherwise, the process ends.

At operation 580, the user 340 is connected to the meeting. The process then ends.

Figure 6:
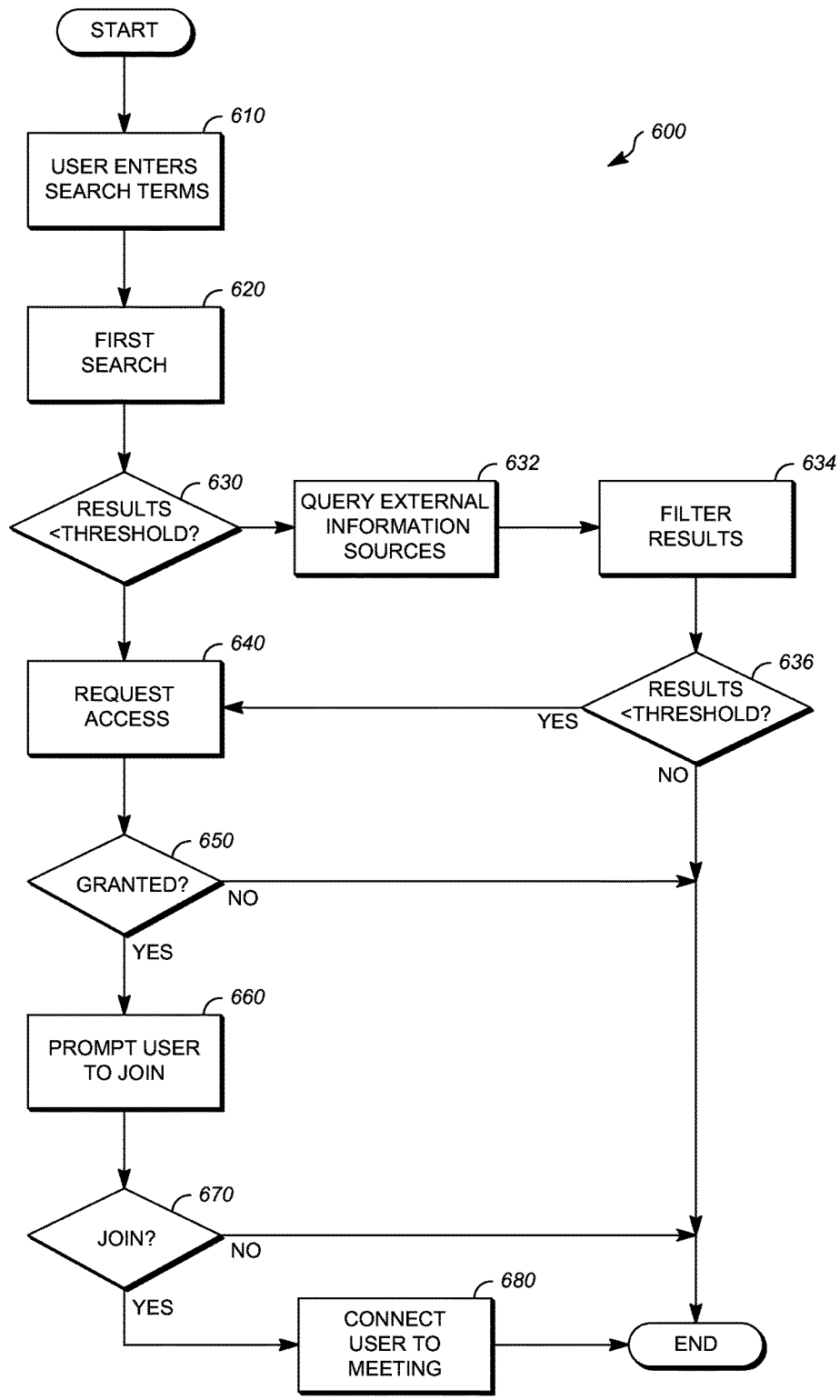
FIG. 6 is a flowchart showing a first example of a process for locating a meeting.

FIG. 6 is a flowchart showing an example of a second process 600 for locating a meeting. The operations described in connection with the second process 600 can be performed at one or more computers, such as at the one or more server computers 132 of the application hosting service 130, or at the user system 110. When an operation is described as being performed by one or more computers, it is completed when it is performed by one computer working alone, or by multiple computers working together. The operations described in connection with the second process 600 can be embodied as a non-transitory computer readable storage medium including program instructions executable by one or more processors that, when executed, cause the one or more processors to perform the operations. For example, the operations described in connection with the second process 600 can be stored at the memory 220 of one of the server computers 132 for execution by the CPU 210 thereof.

Initially the user 340 contacts the meeting manager 310. The user can do this, for example, by accessing an internet web page that serves as a portal or landing page for the meeting system 300. This web page is output for display at a computing device that is being used by the user 340. In operation 610, the user 340 enters one or more search terms. This can be done, for example, by entering the one or more search terms into a dialog box that is part of a user interface screen provided by the meeting system 300. In this example, the search term received at operation 610 is a non-unique identifier that may match many of the meeting participants 350. The search term entered at operation 610 is transmitted to and received by the meeting manager 310.

In operation 620, a first search is performed by the meeting manager 310 to determine whether at least a first search term from the one or more search terms input at operation 610 matches any in-progress meetings. The first search term can match an in-progress meeting if the search term matches to information for the organizer or, optionally, another participant of an in-progress meeting. This determination can be made using the in-progress meeting information 314. Optionally, multiple search terms can be utilized in the first search performed at operation 620.

Because the one or more search terms in this example are non-unique identifiers, more than one match can result from the first search at operation 620. In some situations, a large number of matches can be returned at operation 620. Because of this, at operation 630, a determination is made as to whether the number of results is less than a threshold value. This operation prevents the meeting manager 310 from sending an overly large number of access request messages. If the number of results is less than the threshold value, the process proceeds to operation 640. If the number of results is greater than the threshold value, the process proceeds to operation 632.

At operation 632, the information lookup component 316 is utilized to acquire additional information from the external information sources 330. The additional information can include information regarding some or all of the meeting participants 350 matched at operation 620. The additional information can also include information about the user 340 that is attempting to locate a meeting. At operation 634, the additional information obtained at operation 632 is utilized to filter the results obtained at operation 620. As one example, the results can be filtered by applying one of the one or more search terms from operation 610 to the additional information. As another example, the results can be filtered by identifying a relationship between the user 340 and some or all of the meeting participants 350 that were matched at operation 620. This relationship can be, for example, an entry in a contact list or a connection between users in their social networking profiles. A filtered list of results is generated as a result of operation 634. At operation 636 if the number of results is less than the threshold value, the process proceeds to operation 640. Otherwise, the process ends.

At operation 640, the meeting manager 310 contacts one or more meeting participants 350 that were identified at operation 630. This is done, for example, by transmitting an access request message to each of the identified meeting participants 350. The number of access request messages sent is dependent on the results of the search, up to the threshold value used at operation 630. The access request message can be in the form of a user interface element that is output for display as part of a meeting interface screen. The access request message can identify the user 340 that wishes to join the meeting and prompts the meeting participant 350 for an answer as to whether or not the user 340 should be permitted to join the meeting. The answer can be made by the participant in the form of an input, such as by clicking a button in the interfaces, which causes a corresponding message to be transmitted to the meeting manager 310. At operation 650 the process proceeds to operation 660 if access is granted. Otherwise, the process ends.

At operation 660, the meeting manager 310 transmits a message to the user 340, indicating that the user has been granted access to join the meeting. This message can cause interface elements to be output for display as part of an interface screen at the computing device utilized by the user 340. These interface elements, such as buttons, can allow the user 340 to join the meeting or decline to join the meeting. The information transmitted to the user 340 can also include information that confirms the identity of the meeting participant 350 that granted access to the user 340. In response to an input from the user 340 indicating intention to join or not join the meeting, a further message is transmitted from the computing device of the user 340 to the meeting manager 310. At operation 670 the process proceeds to operation 680 if the user 340 elected to join the meeting. Otherwise, the process ends.

At operation 680, the user 340 is connected to the meeting. The process then ends.

The examples given above all conduct searches against the identities of users that are currently connected to a meeting using the meeting host 320. It should be understood that these techniques can also be applied with respect to users that are not currently connected to a meeting. In particular, where a search returns a single user (such as via a unique identifier), but that user is not currently connected to an in-progress meeting, the identified user can be sent a notification such as by email, instant message, SMS, or any other type of messaging service. The message can allow the user to start a new meeting with the user that conducted the search, such as by including a link (e.g. a hyperlink) in the message that, when used, causes the user to join a meeting and invites the searching user to join the newly initiated meeting.

In a first example usage scenario, a first user named James has been invited to a video chat meeting by a second user named Steve. In particular, Steve sent James an email that included an alphanumeric code that can be utilized to access the meeting. James is one of several users that Steve has invited to the meeting in this way. At the designated time for the meeting, Steve initiates the video chat and designates it as a private meeting, meaning that only the users who were invited are able to access the meeting. Some of the other users join using the alphanumeric code. James is aware that it is time for him to join the meeting, be he is unable to locate the invitation email that Steve sent to him. Because of this, James is not able to use the alphanumeric code to join the meeting.

Figure 7:
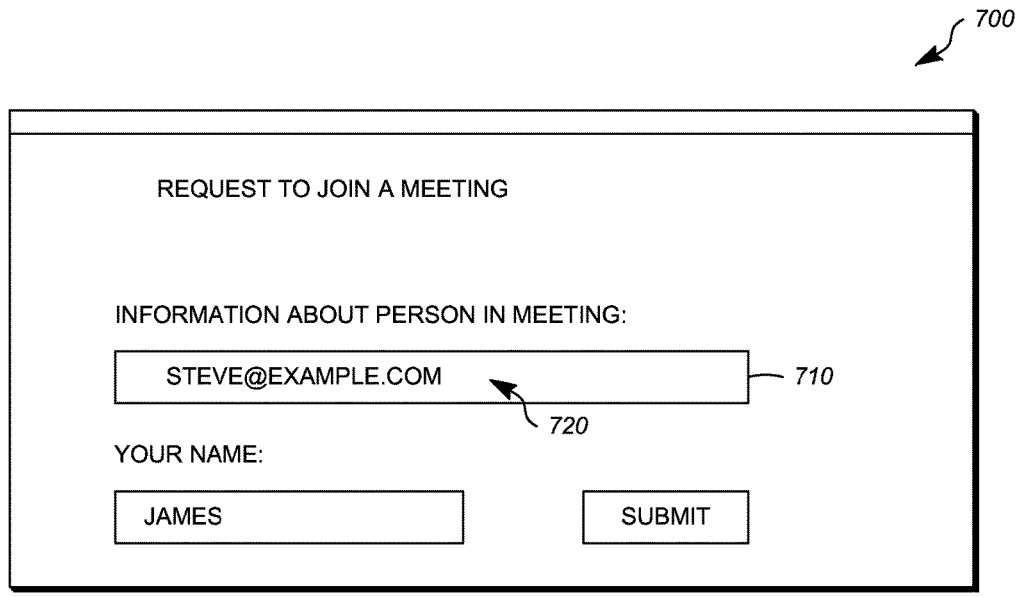
FIG. 7 is an illustration showing a first dialog box.
Figure 8:
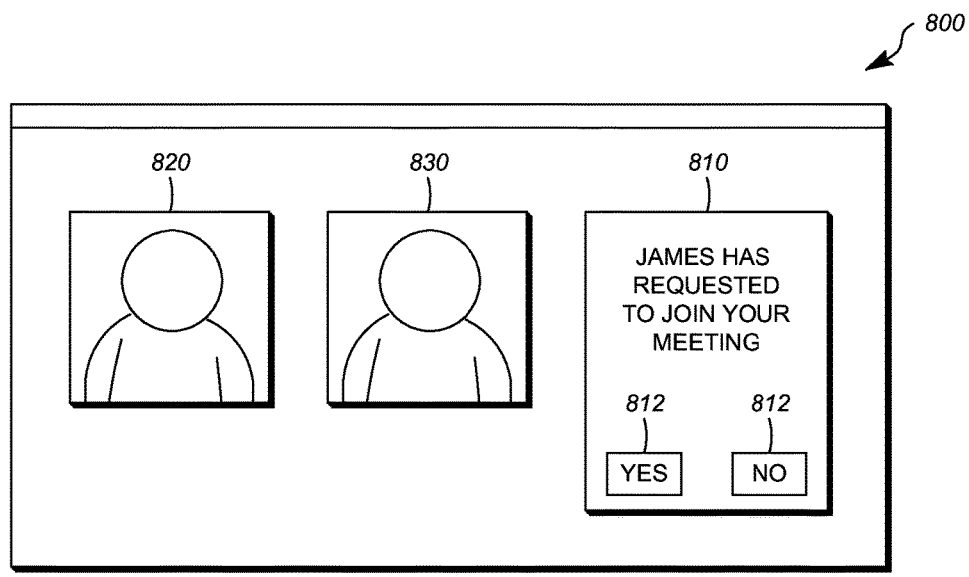
FIG. 8 is an illustration showing a first view of a meeting interface.
Figure 9:
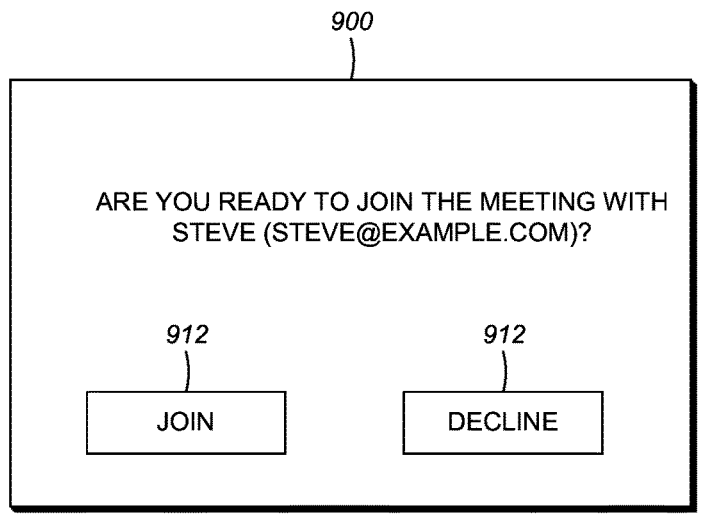
FIG. 9 is an illustration showing a second dialog box.

James accesses a web page user interface 700 provided by the meeting manager 310, as shown in FIG. 7. In a dialog box 710, James enters Steve's email address 720. A message corresponding to this user input is transmitted to the meeting manager 310. In response, the meeting manager compares the email address 720 to the in-progress meeting information 314 and identifies an in-progress meeting to which Steve is connected.

After identifying Steve based on the user input provided by James, the meeting manager 310 transmits an access request message 810 to a computing device associated with Steve. In this example, the access request message 810 is displayed in the form of a dialog box in a meeting interface 800, which is a video call interface with video shown for a first participant 820 and a second participant 830. The dialog box displayed as the access request message 810 can include information that identifies James and interface elements such as buttons 812 that allow Steve to respond to the request. Steve selects the button 812 labelled "Yes," which transmits a message to the meeting manager 310 indicating that Steve wishes to grant James access to the meeting. The meeting manager 310 then transmits a message to the computing device used by James, indicating that James is permitted to join the meeting. This message can cause a dialog box 910 to be output for display in the web page user interface 700 at the computing device used by James. The dialog box 910 prompts James to join or decline via buttons 912. James uses the button 912 labelled "Join" to indicate that he wishes to join the meeting, and a corresponding message is sent to the meeting manager 310.

Figure 10:
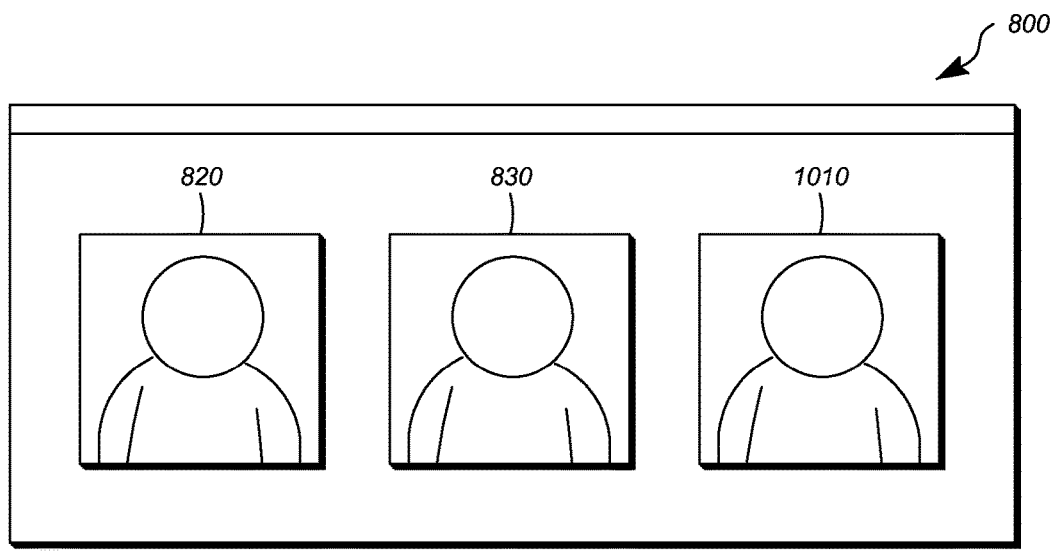
FIG. 10 is an illustration showing a second view of a meeting interface.

The meeting manager 310 then directs the meeting host 320 to add James to the meeting. James is added to the meeting, for example, by adding video of James in the meeting interface 800 as a third participant 1010, as show in FIG. 10.

In a second example usage scenario, a first user named Sara has been invited to a video chat meeting by a second user named Jennifer. In particular, Jennifer sent Sara an email that included a hyperlink that can be utilized to access the meeting. Sara is one of several users that Jennifer has invited to the meeting in this way. At the designated time for the meeting, Jennifer initiates the video chat and designates it as a private meeting, meaning that only the users who were invited are able to access the meeting. Some of the other users join using the alphanumeric code. Sara is aware that it is time for her to join the meeting, be he is unable to locate the invitation email. Because of this, Sara is not able to use the hyperlink to join the meeting.

Sara accesses a web page user interface provided by the meeting manager 310. Sara does not recall Jennifer's name, but remembers the name of the company that Jennifer works for. In a dialog box, Sara enters the name of Jennifer's company. A message corresponding to this user input is transmitted to the meeting manager 310. In response, the meeting manager compares the name of the company that was supplied by Sara to the in-progress meeting information 314 and identifies multiple in-progress meetings being held by persons associated with that company.

The meeting manager 310 transmits access request messages to the computing devices associated with each of the individuals associated with the company identified by Sara. Persons other than Jennifer dismiss the messages that they receive as a result of this, because they do not know Sara. Jennifer, upon receiving the access request message, agrees to grant Sara access to the meeting by selecting a button labelled "Yes" in the meeting interface screen displayed by her computing device, which causes transmission of a message to the meeting manager 310 indicating that Sara can be added to the meeting. The meeting manager 310 then transmits a message to the computing device used by Sara, causing a message to be displayed to Sara, indicating that she is permitted to connect to the meeting with Jennifer. In response to this message, uses the button 912 labelled "Join" to indicate that he wishes to join the meeting, and a corresponding message is sent to the meeting manager 310.

The meeting manager 310 then directs the meeting host 320 to add Sara to the meeting, and Sara is connected by the meeting host 320.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the spirit and scope of the appended claims.

The invention claimed is:

1. A method comprising:
receiving, at a meeting server, a first input from a first computing device associated with a first user, wherein the first input includes a plurality of meeting search terms, wherein the plurality of meeting search terms includes a first search term that includes a non-unique identifier that corresponds to more than one person;
identifying, at the meeting server, an initial set of matches by matching the first search term to information describing meetings that are hosted by the meeting server and are currently in-progress;
comparing, at the meeting server, a number of matches in the initial set of matches with a threshold;
when the number of matches is less than the threshold, identifying, at the meeting server, a second user who is connected to an in-progress meeting from the initial set of matches;
when the number of matches is greater than the threshold:
identifying, at the meeting server, additional information from an external information source, wherein the additional information includes information regarding one or more meeting participants and information regarding the first user;
filtering, at the meeting server, the initial set of matches based on the additional information to define a filtered set of matches that includes only meetings having at least one meeting participant with which the first user has an existing relationship identified using the additional information accessed by the meeting server; and
identifying, at the meeting server, the second user who is connected to the in-progress meeting from the filtered set of matches using the first input based on a match of the first search term to the additional information associated with the second user;
transmitting an access request message from the meeting server to a second computing device associated with the second user; and
in response to receiving a positive response to the access request message at the meeting server from the second computing device, granting the first user access to the in-progress meeting.

2. The method of claim 1, further comprising:
subsequent to granting the first user access to the in-progress meeting, connecting the first computing device to the in-progress meeting.

3. The method of claim 1, further comprising:
transmitting a meeting join message from the meeting server to the first computing device; and
in response to receiving a positive response to the meeting join message at the meeting server from the first computing device, connecting the first computing device to the in-progress meeting.

4. The method of claim 1, wherein the first input is a non-unique identifier.

5. The method of claim 1, wherein the first input is a unique identifier.

6. The method of claim 1, wherein the additional information includes social media profiles.

7. An apparatus comprising:
a memory; and
a processor configured to execute instructions stored in the memory to:
receive a first input from a first computing device associated with a first user, wherein the first input includes a plurality of meeting search terms, wherein the plurality of meeting search terms includes a first search term that includes a non-unique identifier that corresponds to more than one person;
identify an initial set of matches by matching the first search term to information describing meetings that are hosted by a meeting server and are currently in-progress;
compare a number of matches in the initial set of matches with a threshold;
when the number of matches is less than the threshold, identifying a second user who is connected to an in-progress meeting from the initial set of matches;
when the number of matches is greater than the threshold:
identify additional information from an external information source, wherein the additional information includes information regarding one or more meeting participants and information regarding the first user;
filter the initial set of matches based on the additional information to define a filtered set of matches that includes only meetings having at least one meeting participant with which the first user has an existing relationship identified using the additional information; and
identify the second user who is connected to the in-progress meeting from the filtered set of matches using the first input based on a match of the first search term to the additional information associated with the second user;
transmit an access request message to a second computing device associated with the second user; and
in response to receiving a positive response to the access request message from the second computing device, grant the first user access to the in-progress meeting.

8. The apparatus of claim 7, wherein the instructions further cause the processor to:
subsequent to granting the first user access to the in-progress meeting, connect the first computing device to the in-progress meeting.

9. The apparatus of claim 7, wherein the instructions further cause the processor to:
transmit a meeting join message to the first computing device; and
in response to receiving a positive response to the meeting join message from the first computing device, connecting the first computing device to the in-progress meeting.

10. The apparatus of claim 7, wherein the first input is a non-unique identifier.

11. The apparatus of claim 7, wherein the first input is a unique identifier.

12. The apparatus of claim 7, wherein the additional information includes social media profiles.

13. A non-transitory computer-readable storage device including program instructions executable by one or more processors that, when executed, cause the one or more processors to perform operations, the operations comprising:
receiving, at a meeting server, a first input from a first computing device associated with a first user, wherein the first input includes a plurality of meeting search terms, wherein the plurality of meeting search terms includes a first search term that includes a non-unique identifier that corresponds to more than one person;
identifying, at the meeting server, an initial set of matches by matching the first search term to information describing meetings that are hosted by the meeting server and are currently in-progress;

comparing, at the meeting server, a number of matches in the initial set of matches with a threshold;

when the number of matches is less than the threshold, identifying, at the meeting server, a second user who is connected to an in-progress meeting from the initial set of matches;

when the number of matches is greater than the threshold:
identifying, at the meeting server, additional information from an external information source, wherein the additional information includes information regarding one or more meeting participants and information regarding the first user;

filtering, at the meeting server, the initial set of matches based on the additional information to define a filtered set of matches that includes only meetings having at least one meeting participant with which the first user has an existing relationship identified using the additional information accessed by the meeting server; and identifying, at the meeting server, the second user who is connected to the in-progress meeting from the filtered set of matches using the first input based on a match of the first search term to the additional information associated with the second user;

transmitting an access request message from the meeting server to a second computing device associated with the second user; and in response to receiving a positive response to the access request message at the meeting server from the second computing device, granting the first user access to the in-progress meeting.

14. The non-transitory computer-readable storage device of claim 13, further comprising:
subsequent to granting the first user access to the in-progress meeting, connecting the first computing device to the in-progress meeting.

15. The non-transitory computer-readable storage device of claim 13, further comprising:
transmitting a meeting join message from the meeting server to the first computing device; and
in response to receiving a positive response to the meeting join message at the meeting server from the first computing device, connecting the first computing device to the in-progress meeting.

16. The non-transitory computer-readable storage device of claim 13, wherein the first input is at least one of a unique identifier or a non-unique identifier.

17. The non-transitory computer-readable storage device of claim 13, wherein the additional information includes social media profiles.

* * * * *